United States Patent [19]
Lorenc et al.

[11] 3,790,090
[45] Feb. 5, 1974

[54] TRUCK BODY

[75] Inventors: Allan L. Lorenc, Fairfax; John E. Blumer, Cedar Rapids, both of Iowa

[73] Assignee: Highway Equipment Company, Cedar Rapids, Iowa

[22] Filed: Mar. 12, 1973

[21] Appl. No.: 340,564

[52] U.S. Cl. .................. 239/666, 239/676, 239/684
[51] Int. Cl. ...................... A01c 19/00, E01c 19/20
[58] Field of Search ............ 239/657, 666, 672–678, 239/684, 687, 689

[56] References Cited
UNITED STATES PATENTS

| | | | |
|---|---|---|---|
| 2,967,056 | 1/1961 | D'Amato ........................ | 239/677 X |
| 2,988,368 | 6/1961 | Kerr ................................ | 239/674 X |
| 3,454,171 | 7/1969 | Lundahl .......................... | 239/679 X |
| 3,510,066 | 5/1970 | Swenson ......................... | 239/657 |

Primary Examiner—M. Henson Wood, Jr.
Assistant Examiner—John J. Love

[57] ABSTRACT

A truck body of the hopper type including a bottom longitudinally extending conveyor and a rear end gate arranged for pivotal opening for dumping without tilting of the truck body and with a metering feed gate in the end gate for use in spreading. The body is further equipped with a spreader of the spinner type which receives material from the conveyor, the spreader being selectively pivotable to one side to facilitate dumping. The conveyor is equipped with a hydraulic power system providing the use of two motors in parallel for high torque and the same two motors in series for high speed.

5 Claims, 11 Drawing Figures

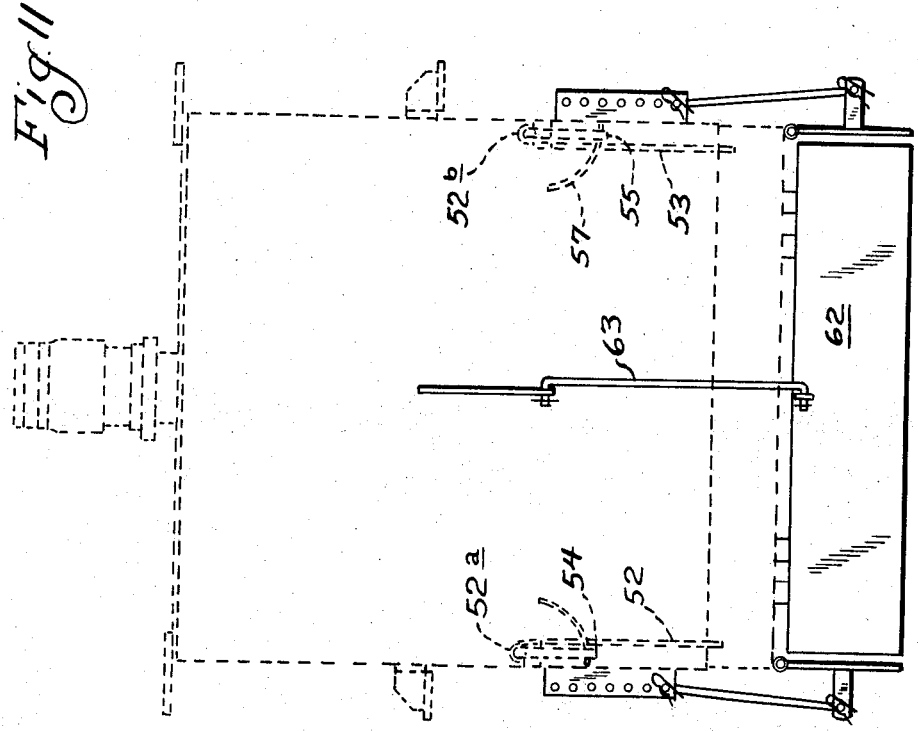
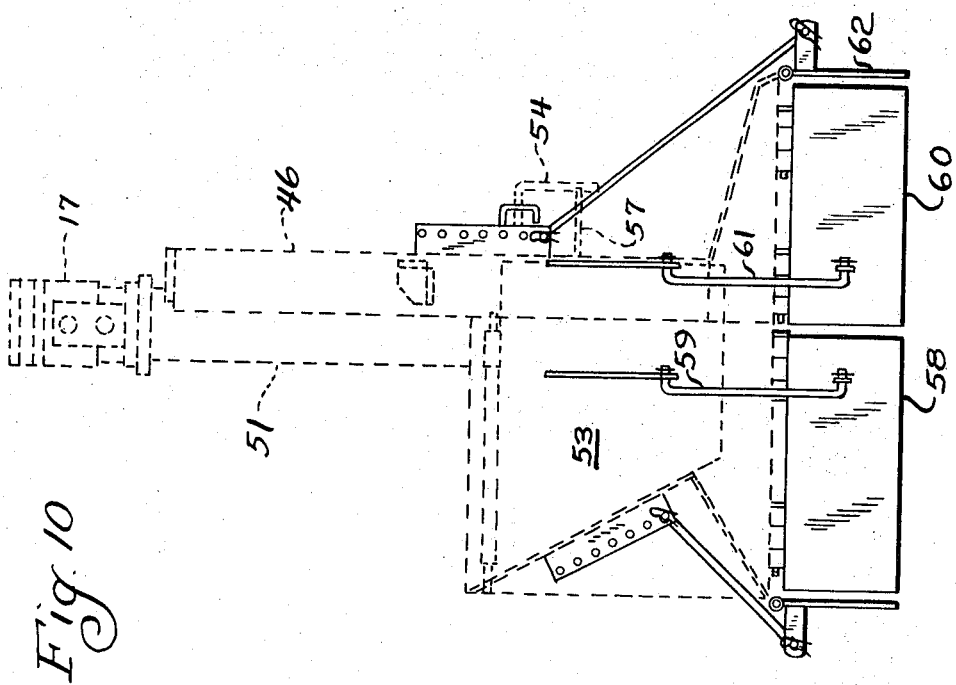

TRUCK BODY

BACKGROUND AND SUMMARY OF INVENTION

Since the majority of hopper-type spreaders used for ice control are not used the year round, or even every day during the winter, the dump body type of mounting has become quite popular. Several significant disadvantages occur in this type of installation, including a higher center of gravity, a higher loading height and potential danger to both life and property because of the possibility of hooking the tilted dump body on an underpass. Also, considerable time can be lost in re-adapting the unit for spreading or dumping.

These disadvantages are overcome in the instant invention which provides a truck body which achieves both dumping and spreading. The entire load or any portion of it is delivered out of a rear swinging end gate or through an adjustable "metering" feed gate in an even, controlled flow by means of a conveyor system. The spreader can be swung either right or left out of the way of the conveyor, or removed entirely so that operation as a dump body can be achieved, either forward or in reverse. The conveyor is powered by a pair of hydraulic motors on the rear drag shaft with the hydraulic circuitry constructed and arranged to couple the motors either in series or in parallel. The other advantages and objectives of the invention stemming from the structure and operation thereof, can be seen from the following detailed description.

DETAILED DESCRIPTION

An embodiment of the invention is explained in conjunction with the accompanying drawing, in which FIG. 1 is a perspective view of the inventive body as seen from the left rear and with the spreader in operative position;

FIGS. 10 and 11 are side and rear elevational views, respectively, of the housing for the spinner assembly with the spinner assembly shown in dotted line.

Figure 1:
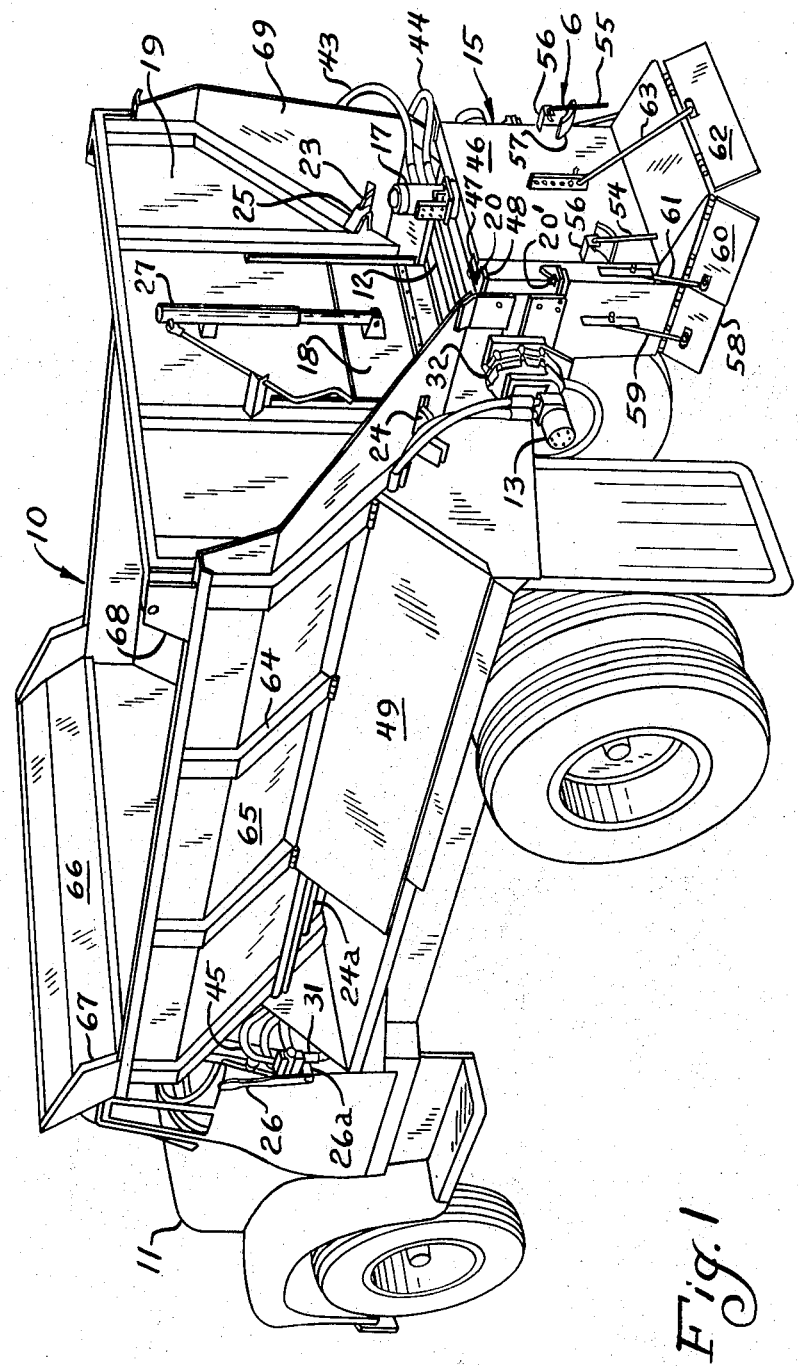

In the illustration given and with reference to FIG. 1, the numeral 10 designates generally the inventive truck body which is seen to be mounted in conventional fashion on a truck 11. As can be quickly seen from FIG. 2, the numeral 12 designates a longitudinally extending conveyor positioned in the bottom of the hopper-like truck body 10. Mounted on the truck body for moving or advancing the conveyor 12 are a pair of hydraulic motors 13 and 14 (compare FIGS. 1 and 3). Further mounted on the truck body and designated generally by the numeral 15 is a spreader mechanism which includes a spinner 16 (see FIG. 2). The spinner is powered by a spinner motor 17 and drives the spinner 16 to spread material delivered by the conveyor 12 past a feed gate 18 provided in the rear end gate 19.

OPERATION GENERALLY

Figure 2:
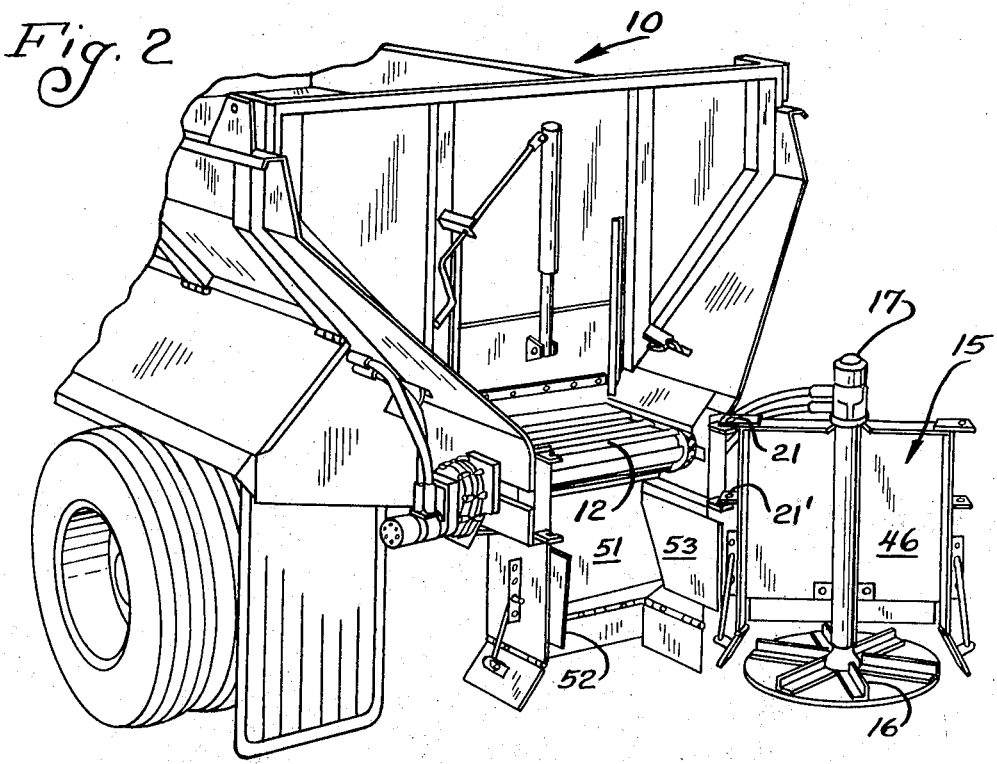
FIG. 2 is a view similar to FIG. 1 but with the spreader swung outwardly to the right incident to starting a dumping operation.

Here reference is first made to FIG. 2 where it is seen that the spreader mechanism 15 has been pivoted to the right. For this purpose a pair of pivot pins 20 and 20' (see FIG. 1) have been removed, permitting the spreader mechanism to pivot about the right hand upper and lower pivot pins 21 and 21'.

Figure 3:
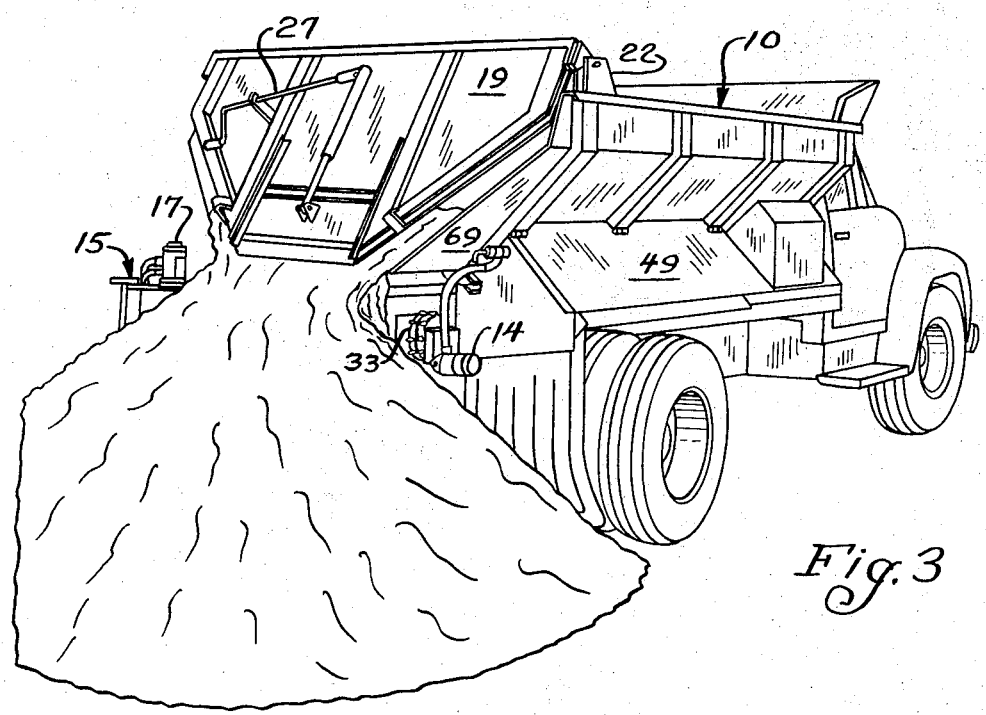
FIG. 3 is a perspective view from the right rear with the spreader mechanism swung to the left and with the rear end gate open and with the truck body dispensing material.

Now turning to FIG. 3 (wherein the pivot pins 21 and 21' have been removed so that the spreader mechanism 15 has been pivoted to the left), it will be noted that the end gate 19 has been partially opened as by pivoting outwardly and upwardly about pivots 22. Normally maintaining the end gate 19 in the closed position seen in FIGS. 1 and 2 are a pair of hooks 23 and 24 (see FIG. 1), which engage hook bars on the end gate 19 as at 25 relative to the hook 23. The end gate retaining hooks are activated by a lever 26 near the cab of the truck 11 (see FIG. 1). The lever 26 rotates a transverse rod 26a which operates through a linkage 24a to release the hook 24 — a similar linkage (not shown) being provided for the hook 23.

When the truck is being operated in the spreading mode, the height of the metering feed gate 18 is adjusted by means of a mechanism generally designated 27 and which is mounted on the rear end gate.

HYDRAULIC SYSTEM

Figure 4:
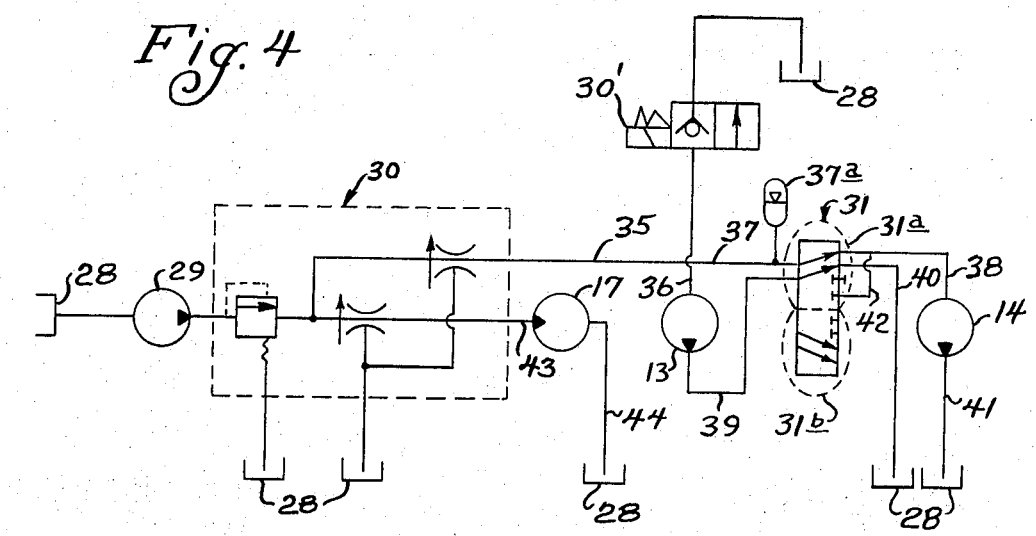
FIG. 4 is a schematic piping diagram for the hydraulic circuitry associated with the inventive truck body.
Figure 5:
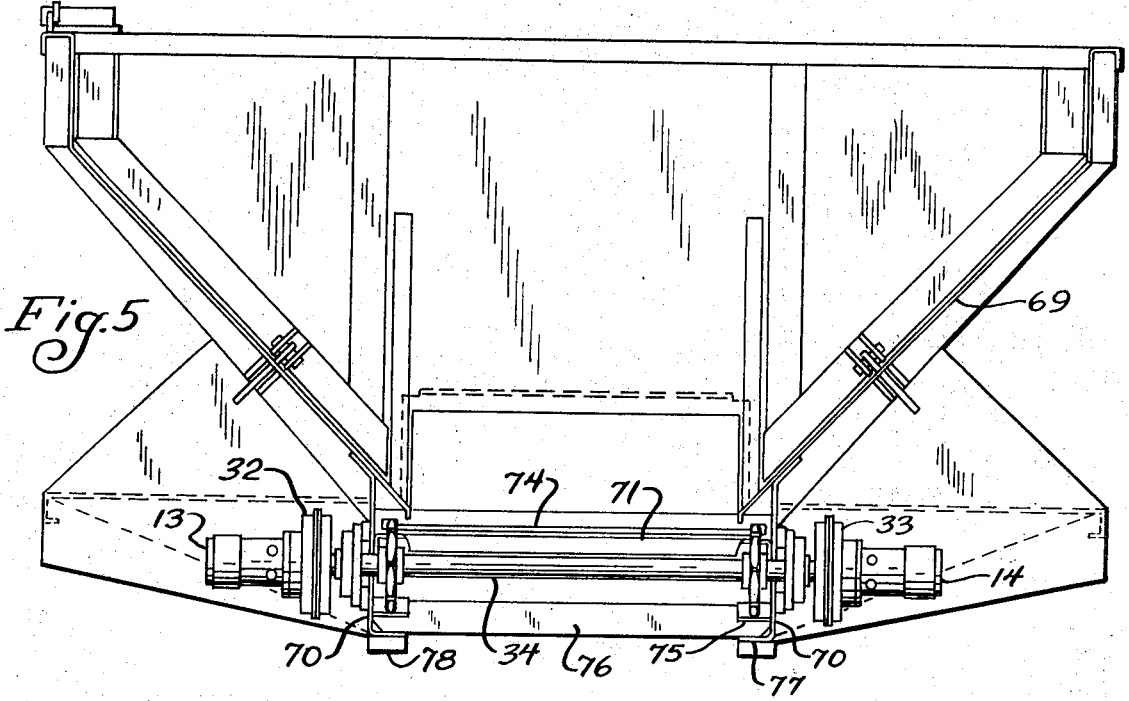
FIG. 5 is a rear end view of the truck body showing details of the conveyor construction.

Reference is now made to FIG. 4 wherein the numeral 28 designates a reservoir which supplies and holds the oil necessary for the operations of the conveyor motors 13 and 14 and the spinner motor 17. The reservoir 28 is coupled to a hydraulic pump 29 which is powered by the truck engine. Coupled to the output of the pump 29 is a dual pressure compensated multi-positioned flow control valve with built-in relief and which is generally designated 30. The control valve 30 controls the speed of the conveyor hydraulic motors 13 and 14 and also the spinner hydraulic motor 17. We provide a parallel-series circuit for the conveyor motors 13 and 14 and this is controlled by a double selector valve generally designated 31. Each conveyor motor 13 and 14 is connected to a reducer gear case as at 32 and 33 (see FIGS. 1 and 3, respectively) and the two gear cases are joined with the conveyor drag or drive shaft 34 (see FIG. 5).

The parallel circuit with the selector valve 31 in the position designated 31a provides the high torque and desired speeds for spreading. Oil from the control valve 30 flows to the conveyor motor 13 via line 35 and line 36 and also through line 37 to the selector valve 31, thence to the other conveyor motor 14 via the line 38. The return oil from each motor (via lines 39, 40 and 41) returns to the reservoir 28.

The series circuit with the selector valve 31 in its alternate position (designated 31b) provides the high conveyor speeds for dumping. Oil from the control valve 30 flows to the conveyor motor 13 via lines 35 and 36. By virtue of the shift in position of the selector valve 31, the line 37 is blocked at the selector valve. Oil from the conveyor motor 13 flows through the selector valve 31 to the conveyor motor 14 via lines 42 and 38. The oil from the conveyor motor 14 returns to the hydraulic reservoir 28.

Oil from the control valve 30 also controls the spinner motor 17 by virtue of flowing through lines 43 and 44. Again oil is returned to the reservoir 28. An optional but advantageous feature is an electrically controlled on-off valve 30' which provides remote control for starting and stopping the conveyor.

An advantageous feature of the invention is the hydraulically controlled conveyor drive. The parallel circuit provides high torque and proper speeds for spreading materials while the series circuit provides high speeds required to stock-pile material. The circuit can be interchanged under full load by moving the lever 45 (see FIG. 1) near the cab of the truck. With large loads, the starting torque required is much greater than the running torque. Therefore, by starting the load with the motors in parallel and shifting to the series circuit, the unloading speed is doubled with virtually no increase in input power.

Also available in the hydraulic circuit (FIG. 4) is an accumulator 37a which will minimize shock loads when shifting from parallel to series circuitry.

In the illustration given, the conveyor has a nominal width of 34 which provides a substantial quantity of mterial for use in the spreading mode. Metering of the material for this purpose is achieved by the combination of the conveyor 12 and the feed or metering gate 18 and proper distribution is effected by the construction of the spreader mechanism 15. This mechanism includes a pivotally mounted enclosure 46 (see FIGS. 1, 2 and 8-11). As indicated previously, pivot pins 20 and 21 are employed for the releasable connection. For this purpose, the enclosure 46 is equipped with lugs as at 47 (see FIG. 1) and the truck body is equipped with cooperative lugs or pivot connections as at 48. It will be appreciated that four pairs of the lugs 47 and 48 are provided for the various pins 20, 21, etc. In the illustration given, it will be noted that swinging of the spreader mechanism to the right (as shown in FIG. 2) permits removal of the spreader mechanism 15 from the path of material during the dumping mode and without disconnection of the hoses or lines 43 and 44 connected to the spinner motor 17. On the other hand, where the spreader mechanism is swung to the left (see FIG. 3), the quick disconnect hoses 43 and 44 are, in fact, disconnected. In addition, the hoses 43 and 44 make possible the attachment of specialized tools such as hydraulic hammers and the like which can be conveniently stowed in the compartments 49 (see FIGS. 1 and 3) which are provided on the lower sides of the truck body 10.

Figure 9:
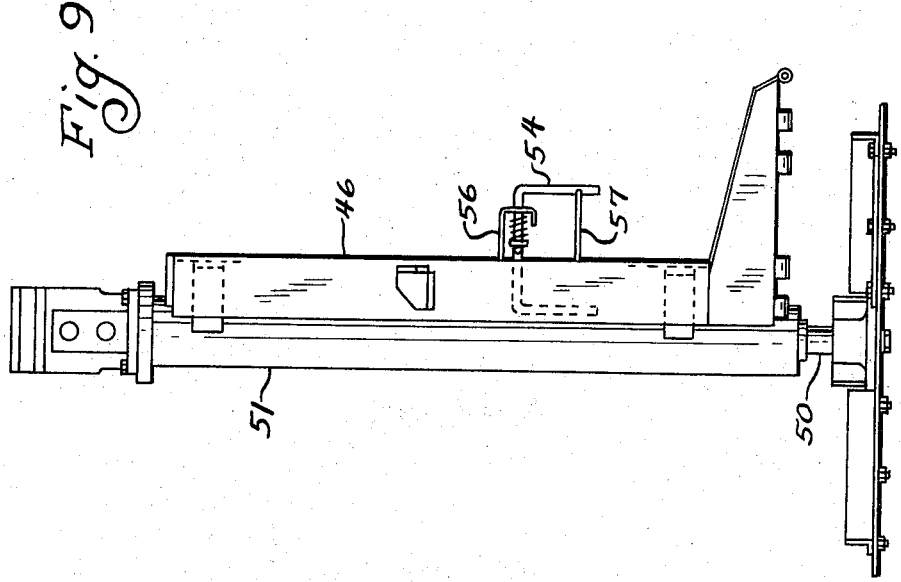
FIGS. 8 and 9 are front and side elevational view, respectively, of the spinner assembly.
Figure 8:
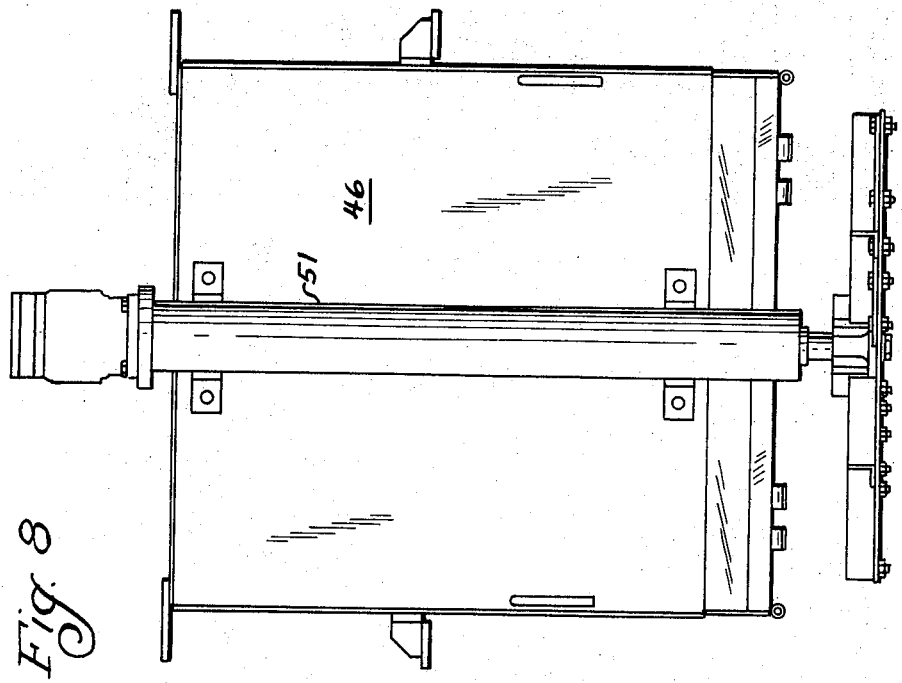

However, in the spreading mode output power from the spinner motor 17 is delivered to the spinner 16 through a spinner shaft 50 encased within a spinner tube 51 (see FIG. 9). Material exiting from the conveyor 12 is directed rearwardly onto the spinner through the cooperation of a front chute wall 51 (see FIGS. 2 and 10) provided as part of the spreader mechanism 15. Also provided to confine and direct the stream of material issuing from the conveyor 12 and falling toward the spinner 16 are internal baffles 52 and 53. The baffles 52 and 53 are pivotally mounted on rods as at 52a and 52b, respectively (see FIG. 11) provided as part of the spreader mechanism 15. The attitude or angle of the internal baffles 52 and 53 is determined by the setting of the baffle control levers 54 and 55, respectively. As can be appreciated from a comparison of FIGS. 1 and 9, the enclosure 15 is equipped with brackets 56 for each lever which, in combination with the enclosure 46 provide a pivotal mounting for the U-shaped levers 54 and 55. Each lever 54 and 55 can be locked in a given angular position by the engagement thereof with a toothed or notched plate 57 which projects rearwardly from the enclosure 46. The inner end of each U-shaped lever 54 and 55 is positioned outwardly of its associated internal baffle 52 or 53, as the case may be. Thus, by turning the lever 54 or 55 inwardly, the internal baffle 52 or 53 is moved from its normal vertical orientation to one where it is inwardly directed, thereby directing the flow of material more centrally of the spinner. For example, when it is desired to spread primarily on the right side of a roadway (with sand or salt) the lever 55 (as viewed from the rear) is moved clockwise with the lever 54 remaining in its downwardly vertical condition. This results in the baffle 53 being moved to the left so that the material is directed to the left hand forward side of the spinner. Then, with the spinner rotating in a clockwise fashion (when viewed from above), the material is delivered in a pattern primarily on the right side of the vehicle.

Further cooperating in defining the pattern of material discharged during the spreading mode are external baffles as at 58 (see FIG. 1) which are provided as part of the spreader mechanism 15 on each side of the conveyor 12. Each baffle 58 has its attitude or angular disposition determined by the position of a connecting rod 59 (again see FIG. 1). In like fashion, the enclosure 46 is equipped with edternal side baffles as at 60, the position of which is determined by a similar latching mechanism 61. Further, the enclosure has a rear external baffle 62 the position of which is determined by latching mechanism 63.

The truck body 10 is equipped with a number of external side braces as at 64 which, in the illustration given, are four inches wide by two inches in depth. The spaces 65 between adjacent braces (see FIG. 1) permit the ready installation of batts for insulating the load of material carried by the truck body 10. Additionally, the cab shield 66 (again see FIG. 1 — in the upper left hand portion thereof) is equipped with spaced flanges 67 on each side which, in combination with the spaced flanges 68 at the rear upper corners of the truck body 10 permit the installation of planks for extending the sidewalls of the truck body upwardly and thereby accommodate greater loads. It will be appreciated that the space flanges 68 also provide the pivotal mounting for the swinging end gate 19.

Figure 6:
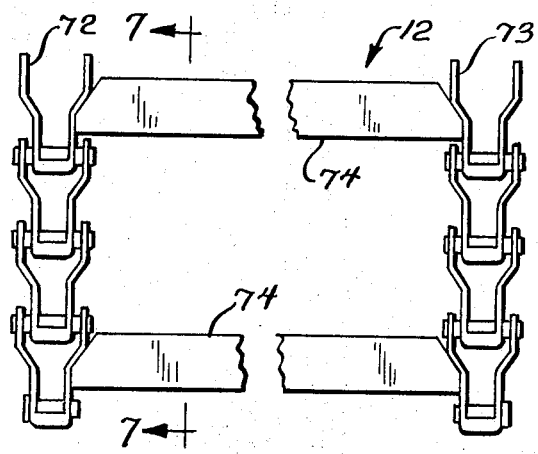
FIGS. 6 and 7 are fragmentary views of the chain conveyor.
Figure 7:
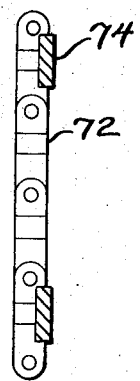

The material stream which issues from the truck body 10 during the dumping mode (see FIG. 3) is confined against lateral movement by virtue of the side sheets 69 (see FIGS. 1 and 5) which project rearwardly from the truck body on each side of the conveyor 12 and which converge as one proceeds downwardly so as to confine the material stream. The lower projections of the side sheets 49 (now refer to FIG. 5) consist of sill plates 70 which afford the mounting for the conveyor drag shaft 34 and the motors 13 and 14 with their associated gear boxes 32 and 33, respectively. The relatively heavy sills 70 also provide support for the bottom panel 71 which defines the platform on which the upper run of the conveyor 12 operates. As seen in FIG. 6, the conveyor 12 includes side chains 72 and 73 which are interconnected by a plurality of longitudinally spaced, transversely extending chain bars 74. The chain bars ride on the bottom panel 71 and direct the material to be dispensed (either in the dumping mode or the spreading mode) to the rear of the truck body. The return run of the chains 72 and 73 ride on elongated wear strips 75 which are mounted on a cross channel 76 fastened to and extending between the two sills 70. It will be noted that the sills 70 have inwardly turned flanges at the bottom ends thereof as at 77 which afford a rigid connection with the cross channel 76 and also provide means for connection of oak beams 78 (nominally 1 by 3) which are employed for the installation of the truck body 10 on the top of the chassis of the truck 11.

Through the use of the invention, a substantial savings of time — two or more hours — is achieved when switching from the dumping mode to the spreading mode, and vice versa. Also during the spreading mode, there is positive metering on the loading of the spinner as compared with intermittent gravity metering which stems from the use of an elevated dump body. An important safety consideration is the elimination of the need for elevating the dump body for either mode and this is facilitated through the use of a single power system.

We claim:

1. A truck body adapted to spread and dump comprising a hopper-like body adapted to be mounted on a truck chassis for self-propelled movement, said body in the bottom thereof having an endless conveyor extending in the fore and aft direction of the truck, means on said body for operating said conveyor, said body at its rear being equipped with an end gate pivoted to said body for swinging movement to permit discharge of relatively large quantities of material urged rearwardly by said conveyor, hook means on said body for maintaining said end gate in closed position, said end gate being equipped with a smaller metering feed gate in the central lower portion thereof disposed above said conveyor, means on said end gate for varying the position of said feed gate relative to said conveyor, a spreader mechanism mounted on said body and exterior thereto and equipped with spinner means aligned with said conveyor and positioned therebelow, and pivot means interconnecting said spread mechanism to said body and selectively disengageable to permit swinging of said spreader mechanism to one side incident to opening said end gate for dumping.

2. The structure of claim 1 in which said conveyor operating means includes a drag cross shaft adjacent the body rear, and motor means on said body coupled to each end of said shaft.

3. The structure of claim 2 in which said conveyor operating means also includes a hydraulic fluid circuit including valve means for selectively coupling said motor means in either series or parallel.

4. The structure of claim 1 in which said body at the rear thereof is equipped with a pair of spaced apart substantially planar baffles extending parallel to said conveyor and positioned in the path of material discharged from said conveyor onto said spinner means, and means operably associated with said spreader mechanism for varying selectively the attitude of each of said internal baffles.

5. The structure of claim 1 in which said pivot means interconnecting said spreader mechanism to said body includes a set of pivots on each side of said spreader mechanism whereby upon detachment of all of the pivot means, the spreader mechanism is adapted to be disconnected and removed from said body.

* * * * *